US012603572B2

(12) United States Patent
Gong et al.

(10) Patent No.: US 12,603,572 B2
(45) Date of Patent: Apr. 14, 2026

(54) CONDUCTION MODE (CRM) CONTROL IN DIGITAL POWER SUPPLY USING MOSFET DRAIN-TO-SOURCE EDGE DETECTION

(71) Applicant: STMicroelectronics International N.V., Geneva (CH)

(72) Inventors: Xun Gong, Shenzhen (CN); Bin Huang, Beijing (CN)

(73) Assignee: STMicroelectronics International N.V., Geneva (CH)

( * ) Notice: Subject to any disclaimer, the term of this patent is extended or adjusted under 35 U.S.C. 154(b) by 165 days.

(21) Appl. No.: 18/608,044

(22) Filed: Mar. 18, 2024

(65) Prior Publication Data

US 2025/0293600 A1      Sep. 18, 2025

(51) Int. Cl.
*H02M 3/157* (2006.01)
*H02M 1/00* (2006.01)
*H02M 3/158* (2006.01)

(52) U.S. Cl.
CPC ......... *H02M 3/157* (2013.01); *H02M 1/0009* (2021.05); *H02M 1/0025* (2021.05); *H02M 3/158* (2013.01)

(58) Field of Classification Search
CPC .... H02M 3/157; H02M 3/158; H02M 1/0009; H02M 1/0025
See application file for complete search history.

(56) References Cited

U.S. PATENT DOCUMENTS

| | | | | |
|---|---|---|---|---|
| 5,969,958 | A * | 10/1999 | Nielsen | G01R 19/25 318/811 |
| 10,312,743 | B2 | 6/2019 | Ouda et al. | |
| 10,763,743 | B1 * | 9/2020 | Zuccollo | H02M 1/38 |
| 10,826,503 | B1 * | 11/2020 | Chen | H03L 7/091 |
| 2014/0117959 | A1 | 5/2014 | Costa | |
| 2014/0375332 | A1 * | 12/2014 | Michal | G01R 19/16538 324/537 |
| 2016/0161562 | A1 * | 6/2016 | Stulrajter | G01R 31/343 324/650 |
| 2019/0006995 | A1 * | 1/2019 | Jurkov | H03F 1/565 |

(Continued)

OTHER PUBLICATIONS

Min, Run, et al.: "Unified Pulse Width-Cycle Control Strategy to Achieve Mixed DCM/CRM Operation and Consistent Valley Switching for Boost PFC Converter," IEEE Power Electronics Regular Paper/Letter/Correspondence, 2021, 12 pg.

*Primary Examiner* — Rafael O De Leon De Domenech
(74) *Attorney, Agent, or Firm* — Crowe & Dunlevy LLC

(57) ABSTRACT

A method of operating a DC-DC converter includes generating a high-side control signal for a high-side transistor and generating a low-side control signal for a low-side transistor to thereby cause conversion of an input voltage to an output voltage. A time shift is measured between a falling edge of the low-side control signal and a time at which a drain-to-source voltage of the low-side transistor becomes higher than a set threshold voltage. A time shift error is determined as a difference between a dead time and the measured time shift, with the dead time being a time between the falling edge of the low-side control signal and a rising edge of the high-side control signal. A frequency of the high-side control signal and the low-side control signal is adjusted, based upon the time shift error, to maintain the DC-DC converter as operating in critical conduction mode.

15 Claims, 2 Drawing Sheets

Reference Time Shift (fixed)

(56)     References Cited

U.S. PATENT DOCUMENTS

| | | |
|---|---|---|
| 2019/0123653 A1 | 4/2019 | Michal et al. |
| 2020/0028501 A1 | 1/2020 | Abesingha et al. |
| 2021/0021271 A1* | 1/2021 | Chen ........................ H03L 7/07 |
| 2023/0291316 A1 | 9/2023 | Liu |

* cited by examiner

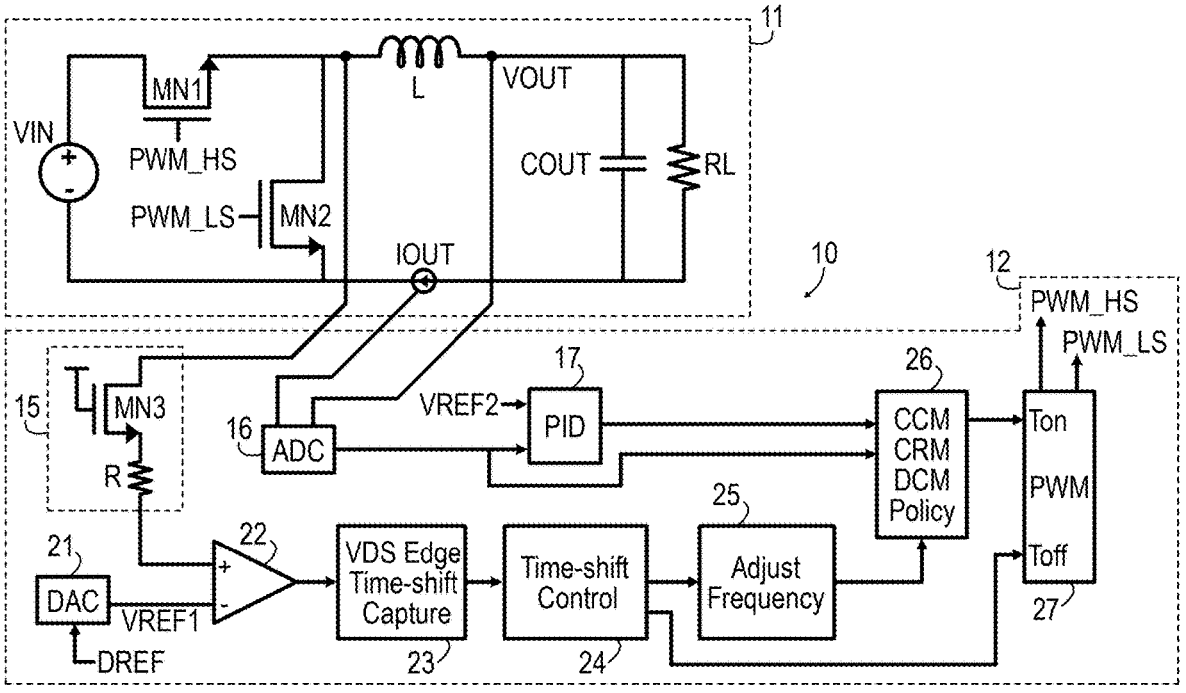
FIG. 1     Reference Time Shift (fixed)
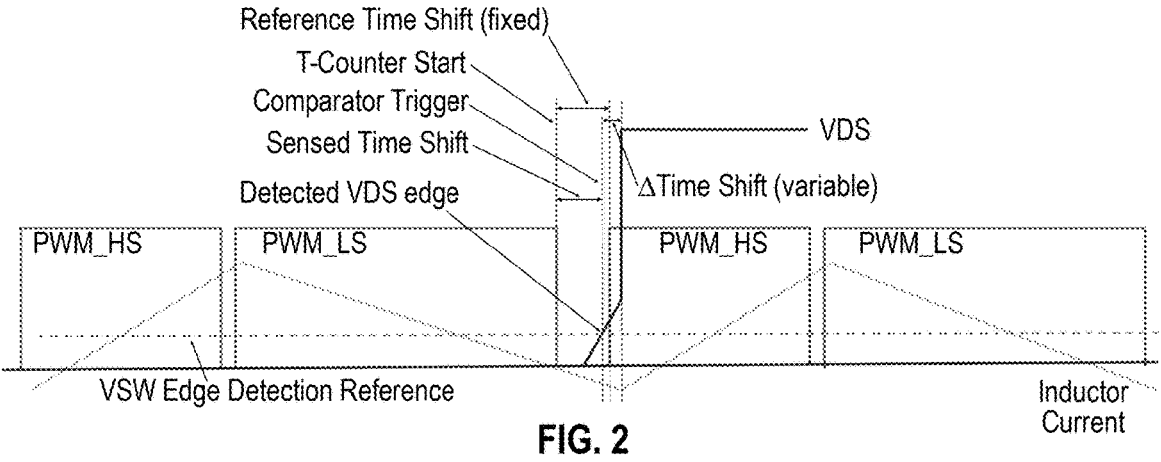
FIG. 2

CONDUCTION MODE (CRM) CONTROL IN DIGITAL POWER SUPPLY USING MOSFET DRAIN-TO-SOURCE EDGE DETECTION

TECHNICAL FIELD

This disclosure is directed to the field of switched mode power supplies (SMPS) and, in particular, to control techniques (and associated circuitry) for Critical Conduction Mode (CRM) operation of a SMPS.

BACKGROUND

Switched mode power supplies (SMPS) are an often-utilized component in modern electronic systems, offering efficient power conversion and regulation. One operation mode of interest in these systems is the Critical Conduction Mode (CRM), which is increasingly preferred in various applications due to its ability to minimize inductor size, enhance efficiency, and improve electromagnetic compatibility (EMC) performance. Given these advantages, CRM finds extensive use in the market, particularly in low-power applications such as AC/DC adapters.

Conventionally, CRM operation in an SMPS involves precise detection of the inductor current zero-crossing point, achieved through a zero-current detection (ZCD) circuit, or involves precise detection of the valley point in the drain-to-source voltage (VDS) of the power MOS, achieved through a drain-to-source voltage sensing circuit. From the detection of the inductor current zero-cross or the valley point of the VDS of the power MOS, the rising edge of the Pulse Width Modulation (PWM) signal can be synchronized such that the resulting switch-on moment of the power MOS coincides with the inductor current reaching zero.

However, these conventional methods present several limitations. One drawback is the necessity for additional components such as the ZCD circuit or an auxiliary winding utilized for sensing the VDS of the power MOS. Such requirements not only add to the complexity but also increase the physical footprint of the power supply design.

Adding even more to the complexity is that in practical applications, it is often desirable to have a mix of Continuous Conduction Mode (CCM), CRM, and Discontinuous Conduction Mode (DCM) for optimizing inductor size and achieving high efficiency under varying load conditions, yet existing implementations do not easily allow for on-the-fly switching between CCM, CRM, and DCM modes. This inflexibility can be a drawback in dynamic applications where load conditions change rapidly and require swift mode transitions for optimal performance.

Given this, further development into both control techniques (and associated circuitry) for CRM operation as well as control techniques (and associated circuitry) for on-the-fly switching between CCM, CRM, and DCM modes is necessary.

SUMMARY

Disclosed herein is a method of operating a DC-DC converter, including: generating a high-side control signal for a high-side transistor of the DC-DC converter and generating a low-side control signal for a low-side transistor of the DC-DC converter to thereby cause conversion of an input voltage to an output voltage; measuring a time shift between a falling edge of the low-side control signal and a time at which a drain-to-source voltage of the low-side transistor becomes higher than a set threshold voltage;

determining a time shift error as a difference between a dead time and the measured time shift, with the dead time being a time between the falling edge of the low-side control signal and a rising edge of the high-side control signal; and adjusting a frequency of the high-side control signal and the low-side control signal, based upon the time shift error, to maintain the DC-DC converter as operating in critical conduction mode.

Adjusting the frequency of the high-side control signal and the low-side control signal, based upon the time shift error, may be performed by decreasing the frequency of the high-side control signal and the low-side control signal when the measured time shift is greater than the dead time.

The method may further include maintaining the DC-DC converter as operating in the critical conduction mode, or switching operation of the DC-DC converter to the critical conduction mode, based upon the measured time shift being greater than the dead time.

Adjusting the frequency of the high-side control signal and the low-side control signal, based upon the time shift error, may be performed by increasing the frequency of the high-side control signal and the low-side control signal when the measured time shift is less than the dead time.

The DC-DC converter may be maintained as operating in the critical conduction mode based upon the measured time shift being less than the dead time.

The set threshold voltage may be changed to thereby change a level of negativity of the inductor current occurring during the dead time.

The set threshold voltage may be increased to thereby increase a level of negativity of the inductor current occurring during the dead time.

The set threshold voltage may be decreased to thereby decrease a level of negativity of the inductor current occurring during the dead time.

Also disclosed herein is a power converter including: a DC-DC converter including a high-side transistor and a low-side transistor, the DC-DC converter being operable to convert an input voltage to an output voltage; pulse width modulation (PWM) circuitry configured to generate a high-side control signal for the high-side transistor and generate a low-side control signal for the low-side transistor to thereby cause conversion of the input voltage to the output voltage; a comparator configured to assert its output in response to a drain-to-source voltage of the low-side transistor being greater than a set threshold voltage; time-shift capture circuitry configured to measure a time shift between a falling edge of the low-side control signal and a time at which the comparator is asserted; time-shift control circuitry configured to determine a time shift error as a difference between a dead time and the measured time shift, with the dead time being a time between the falling edge of the low-side control signal and a rising edge of the high-side control signal; frequency adjustment circuitry configured to generate an output signal indicative of a frequency of the high-side control signal and the low-side control signal, based upon the time shift error, that would maintain the DC-DC converter as operating in critical conduction mode; and a policy circuit configured to generate a PWM control signal for the PWM circuitry, based upon the output signal from the frequency adjustment circuitry; wherein the PWM circuitry operates based upon the PWM control signal.

A coupling clamp may clamp the drain-to-source voltage of the low-side transistor and provide that clamped drain-to-source voltage to the comparator.

A digital-to-analog converter may generate the set threshold voltage.

The frequency adjustment circuitry may adjust the frequency of the high-side control signal and the low-side control signal, based upon the time shift error, by decreasing the frequency of the high-side control signal and the low-side control signal when the measured time shift is greater than the dead time.

The policy circuitry may be further configured to maintain the DC-DC converter as operating in the critical conduction mode, or switch operation of the DC-DC converter to the critical conduction mode, based upon the measured time shift being greater than the dead time.

The frequency adjustment circuitry may adjust the frequency of the high-side control signal and the low-side control signal, based upon the time shift error, by increasing the frequency of the high-side control signal and the low-side control signal when the measured time shift is less than the dead time.

The policy circuitry may be further configured to maintain the DC-DC converter as operating in the critical conduction mode based upon the measured time shift being less than the dead time.

BRIEF DESCRIPTION OF THE DRAWINGS

FIG. 1 is a schematic block diagram of a switched mode power supply (SMPS) disclosed herein.

FIG. 2 is a graph showing the PWM signals, inductor current, and low-side transistor drain-to-source voltage of the DC-DC converter of the SMPS of FIG. 1.

DETAILED DESCRIPTION

Figure 3:
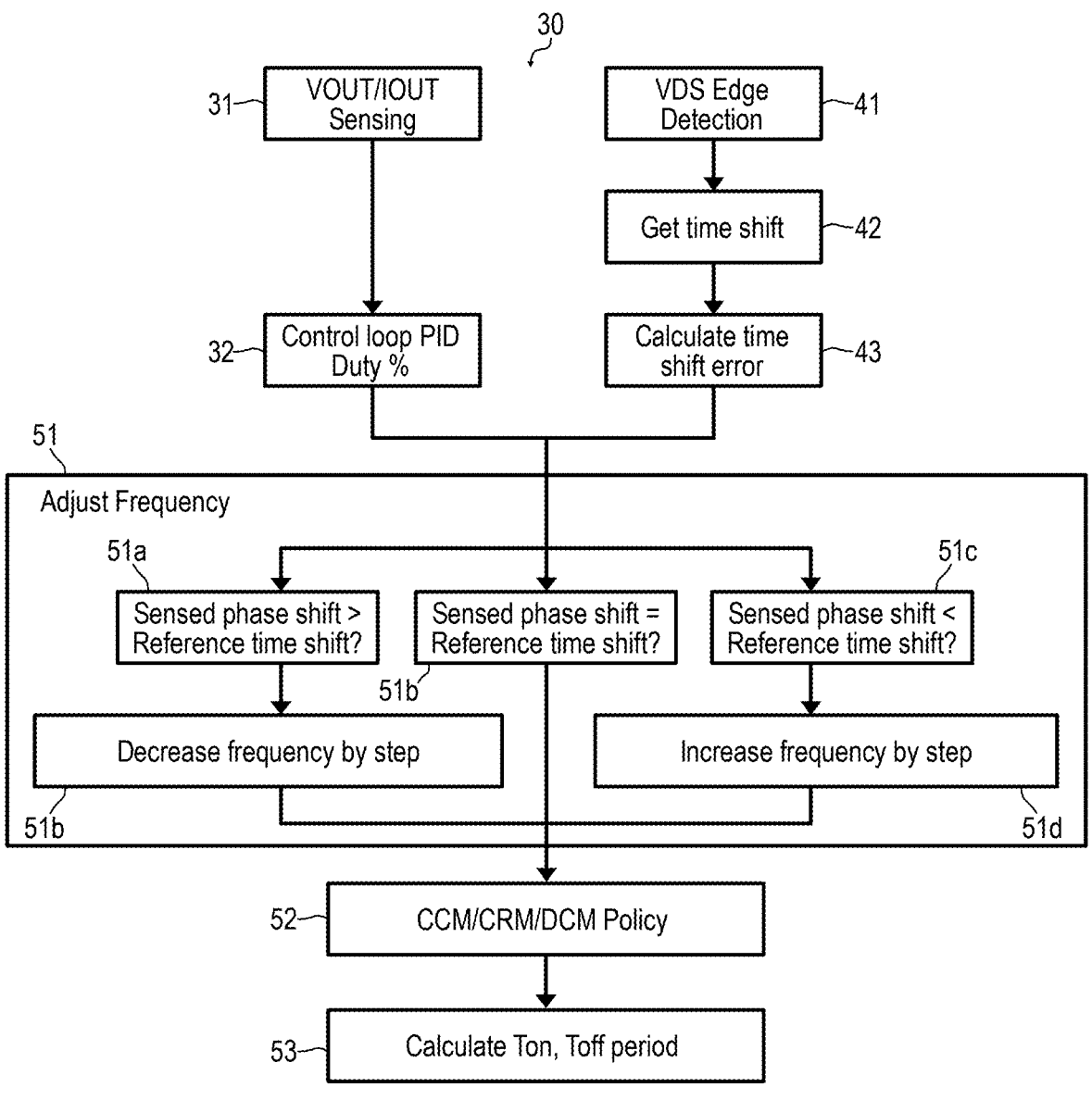
FIG. 3 is a flowchart showing operation of the DC-DC converter of FIG. 1 by the control circuitry of FIG. 1.

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Note that in the following description, any resistor or resistance mentioned is a discrete device, unless stated otherwise, and is not simply an electrical lead between two points. Therefore, any resistor or resistance connected between two points has a higher resistance than a lead between those two points, and such resistor or resistance cannot be interpreted as a lead. Similarly, any capacitor or capacitance mentioned is a discrete device, unless stated otherwise, and is not a parasitic element, unless stated otherwise. Additionally, any inductor or inductance mentioned is a discrete device, unless stated otherwise, and is not a parasitic element, unless stated otherwise.

With reference to FIG. 1, disclosed herein is a switched mode power supply (SMPS) 10, including a DC-DC converter 11 and associated control circuitry 12. The DC-DC converter 11 is arranged as a synchronous Buck converter and includes: a high-side n-channel metal oxide semiconductor (MOS) field effect transistor MN1 having its drain coupled to an input DC voltage VIN, its source connected to a switching node at a first terminal of an inductor L, and its gate coupled to receive the high-side control signal PWM_HS from the PWM generator 27 within the control circuitry 12; a low-side n-channel MOS transistor MN2 having its drain connected to the switching node at the first terminal of the inductor L, its source coupled to ground, and its gate coupled to receive the low-side control signal PWM_LS from the PWM generator 27; output capacitor COUT connected between an output node at a second terminal of the inductor L and ground; and the load (represented by load resistance) RL also connected between the output node at the second terminal of the inductor and ground. An output voltage VOUT is generated across the output capacitor COUT.

Generally speaking, and as will be described in detail below, the control circuitry 12 monitors the drain-to-source voltage of the low-side n-channel transistor MN2 and uses this information when adjusting the dead time between the end of low-side conduction and the beginning of high-side conduction periods.

Continuing on, the control circuitry 12 includes a drain-to-source voltage clamp 15 connected between the switching node at the first terminal of the inductor L and the non-inverting input terminal of comparator 22. The voltage clamp 15 includes n-channel MOS transistor MN3 having its drain connected to the switching node at the first terminal of the inductor L (i.e., at the drain of transistor MN2), its source coupled to the non-inverting input terminal of comparator 22 through resistor R, and its gate coupled to (i.e., biased at) a turn-on voltage (e.g., 3.3V).

A digital-to-analog converter (DAC) 21 generates a reference voltage VREF1 from a digital reference DREF (which is a digital signal representative of VREF1) and provides the reference voltage VREF to the inverting input terminal of comparator 22, which provides its output to the drain-to-source edge time-shift capture circuit 23 as input. The drain-to-source (VDS) edge time-shift capture circuit 23 provides it output to a time-shift control circuit 24, which in turn provides output to a frequency adjustment circuit 25 as well as the PWM generator 27. The frequency adjustment circuit 25 provides output to a policy circuit. An analog-to-digital converter (ADC) 16 receives the output voltage VOUT at the output node and a voltage representative of the output current IOUT as input, and provides output to an input of PID controller 17, the PID controller 17 receiving an additional reference voltage VREF2 as input and providing output to the policy circuit 26. The policy circuit 26 provides output to the PWM generator 27, which, as stated, generates the high-side control signal PWM_HS and the low-side control signal PWM_LS dependent on operating mode (CCM, CRM, DCM).

In operation, the DC-DC converter 11 effectively steps down a higher DC input voltage VIN to a lower DC output voltage VOUT by alternately switching the high-side transistor MN1 and the low-side transistor MN2 on and off, under control of the high-side and low-side pulse-width modulation PWM signals PWM_HS and PWM_LS. When the high-side transistor MN1 is activated via assertion of PWM_HS in a high-side conduction phase, current flows from the input voltage VIN through the inductor L to the output, storing energy in the magnetic field of the inductor. In the low-side conduction phase, when transistor MN1 is off and transistor MN2 is turned on, the inductor L releases its stored energy to the load RL and the output capacitor COUT. This release of energy from the inductor L not only provides power to the load RL but also smooths out voltage ripples, providing for a stable output voltage VOUT. A dead time, during which neither PWM_HS nor PWM_LS are asserted, occurs between the falling edge of PWM_LS and the rising edge of PWM_HS to prevent shoot-through, and between the falling edge of PWM_HS and the rising edge of PWM_LS.

The control circuitry 12 may operate the DC-DC converter 11 in Continuous Conduction Mode (CCM), Discontinuous Conduction Mode (DCM), or Critical Conduction Mode (CRM) by suitably adjusting the pulse width of the PWM signals PWM_HS and PWM_LS, as well as the dead time therebetween, depending upon load conditions. CCM is typically utilized under high load conditions, and when operating in CCM, the timing of turn-on of the high-side transistor MN1 and low-side transistor MN2, as well as the dead time between the turn-off of the low-side transistor MN2 and turn-on of the high-side transistor MN1, is adjusted such that the inductor current does not fall to zero. DCM is typically utilized in lighter load conditions, and when operating in DCM, the timing of turn-on of the high-side transistor MN1 and low-side transistor MN2, as well as the dead time between turn-off of the low-side transistor MN2 and turn-on of the high side transistor MN1, is adjusted such that the inductor current falls to zero and remains there during part of the cycle. CRM is utilized at the boundary between CCM and DCM, and when operating in CRM, the timing of turn-on of the high-side transistor MN1 and low-side transistor MN2, as well as the dead time between turn-off of the low-side transistor MN2 and turn-on of the high-side transistor MN1, is adjusted such that the inductor current is permitted to become negative for a period of time, and as stated, operation in CRM is desirable for reasons of efficiency and inductor size. Details will be provided below.

Keeping this in mind, an aim of the control circuitry 12 can be to operate the DC-DC converter in CRM wherever load conditions make this possible. Consider now the graph of FIG. 2, showing the inductor current, low-side control signal PWM_LS, high-side control signal PWM_HS, and the drain-to-source voltage of the low-side transistor MN2. As can be observed, when the low-side control signal PWM_LS is asserted, the inductor current begins to fall, with the low-side control signal PWM_LS transitioning low after zero-cross of the inductor current.

While PWM_LS is asserted so that low-side transistor MN2 is on, its drain-to-source voltage VDS is close to zero due to the low on-resistance of a MOSFET in saturation. Immediately following the falling edge of PWM_LS, VDS remains close to zero as the inductor current becomes negative, reflecting a reversal of current flow, through the body diode of the low-side transistor MN2, indicating energy is being recirculated in the loop formed by the inductor L and the low-side transistor MN2. As the inductor L reacts to the sudden interruption in current flow at the falling edge of PWM_LS by releasing energy to try to maintain that current, a rise in VDS occurs due to inductive kickback at the node between the inductor L and the drain of the low-side transistor MN2. Note that the falling of the inductor current to a negative value combined with the slew rate of this upward ramping of VDS being relatively slow indicates operation in CRM; conversely, if the inductor current did not drop to zero and the slew rate of the upward ramping of VDS was relatively quick (e.g., higher than the slew rate in CRM), this would be indicative of operation in CCM.

After VDS begins to rise and, in the example shown in FIG. 2, after the triggering of the comparator 22, PWM_HS is asserted, turning on the high-side transistor MN1, connecting the input voltage VIN to the drain of the low-side transistor MN2. As a result of this, VDS sharply rises, as the drain of MN2 is substantially at VIN while the source of MN2 is at ground, and the inductor current begins to rise.

The upward ramp of VDS is detected by comparator 22—when VDS rises to become at least equal to a reference voltage VREF1 output by the DAC 21 (shown as VSW Edge Detection Reference in FIG. 2), the output of comparator 22 is asserted (e.g., the comparator 22 triggers), and the time between the beginning of the PWM counter (which is reset and begins to count at the falling edge of PWM_LS) and the assertion of the output of comparator 22 is captured by the VDS edge time-shift capture circuit 23, and is referred to hereinafter as the sensed or measured time shift. The VDS edge time-shift capture circuit 23 is a high resolution timer capture unit which is reset at the falling edge of PWM_LS and is triggered (stopped) at assertion of the output of the comparator 22, and therefore the output of the VDS edge time-shift capture circuit 23 is a timer value at the triggering of the comparator 22. Therefore, the output of the VDS edge time-shift capture circuit 23 is a digital value representative of the sensed time shift.

The time-shift control circuit 24 calculates what can be referred to as the time shift error, as a difference between a reference time shift (the time period between the falling edge of PWM_LS and the rising edge of PWM_HS) and the sensed time shift. This can be mathematically represented as:

$$\Delta\text{Time-shift} = \text{Reference\_Time\_Shift} - \text{Sensed\_Time\_Shift}$$

The time-shift control circuit 24 applies filtering to the time shift error to reduce the effect of noise and/or parasitic resonance.

The ADC 16 digitizes either the output voltage VOUT or the output current IOUT, which is compared to a second reference voltage VREF2 by the PID controller 17 to produce a duty cycle signal representative of the duty cycle of the DC-DC converter 11. This duty cycle signal represents the duty cycle as a percentage (for example, 0V to 0.99V).

The goal of the time-shift control circuit 24 is to generate a control signal to the frequency adjustment circuit 25 to cause the frequency adjustment circuit 25 to generate a frequency signal representative of the PWM frequency for the next switching cycle, that when input to the policy circuit 26, causes the policy circuit 26 to generate control signals to the PWM generator 27 to cause the PWM generator 27 to adjust the frequency the PWM signals PWM_HS and PWM_LS accordingly.

In greater detail, when ΔTime-shift is greater than a certain set threshold, the time-shift control circuit 24 generates a control signal, that when input to the policy circuit 26, ultimately causes the PWM generator 27 to decrease the frequency of the PWM signals, with the policy circuit 26 maintaining operation of the DC-DC converter 11 in CRM or shifting operation of the DC-DC converter 11 to CRM dependent on load conditions. Through successive iterations, this operation continues until the frequency of the PWM signals is decreased such that ΔTime-shift is equal to the aforementioned threshold.

When ΔTime-shift is less than a certain set threshold, the time-shift control circuit 24 generates a control signal, that when input to the policy circuit 26, ultimately causes the PWM generator 27 to increase the frequency of the PWM signals, with the policy circuit 26 maintaining operation of the DC-DC converter 11 in CRM. Through successive iterations, this operation continues until the frequency of the PWM signals is increased such that ΔTime-shift is equal to the aforementioned threshold.

Recall that the duty cycle signal output by the PID controller 17 represents the duty cycle as a percentage (for example, 0V to 0.99V). A new duty cycle time count can be calculated by the PWM generator 27 from this as a product of this duty cycle signal and the newly calculated period (calculated based on the control signal output by the policy circuit 26, keeping in mind that period is one over the newly calculated frequency). Mathematically, this can be represented as:

$$Duty\ Cycle\ Time\ Count = Period \times Duty\ C$$

$$With\ Period = 1/Frequency$$

Transistor on time (Ton) can be calculated as the new duty cycle time count, with transistor off time (Toff) being calculated as the difference between the newly calculated period and Ton. Mathematically, this can be represented as:

$$Ton = Duty\ Cycle\ Time\ Count$$

$$Toff = Period \times Ton$$

Note that by changing the value of the digital reference DREF, the output VREF1 of the DAC 21 may be changed, with the result being that the triggering point of the controller 22 is changed. The result of this is that the sensed time shift changes, and in turn the calculation of the time shift error e.g., ΔTime-shift) changes. This way, the negative current flowing in the inductor during the dead time between low-side conduction and high-side conduction may be altered.

To change from CRM to CCM or DCM, the policy circuit 26 may alter the control signals to the PWM circuit 27 so as to further change the transistor on time Ton and off time Toff periods (e.g., alter the timing and duration of the PWM signals PWM_HS and PWM_HS) appropriately.

Greater details of operation of the policy circuit 26 are now provided. In particular, in CCM, the switching period is fixed regardless of the sensed time shift and therefore time shift control is not enables. If the load or inductor current is less that a given threshold, the policy circuit 26 decreases frequency, and inductor current slew rate will increase. If the frequency is sufficiently decreased such that the inductor current falls negative between the falling edge of PWM_LS and the rising edge of PWM_HS, CRM mode is engaged. If load demand increases such that the average inductor current becomes greater than a threshold, the switching frequency will be increased by the policy circuit 26, which may result in switchover to CCM mode. If the load demand is sufficiently low (e.g., too low for CRM mode), the policy circuit 26 will clamp the frequency to a minimum frequency, time shift control will be disabled, and the operation mode will switchover to DCM.

A flowchart 30 of the combined operation of the control circuitry 21 is shown in FIG. 3. Here, output voltage VOUT or output current IOUT sensing is performed (Block 31), with PID control then outputting a duty cycle for the PWM signal (Block 32). This duty cycle is fed to the policy circuit (Block 51). In parallel with this, the edge of the drain-to-source voltage of the low-side transistor MN2 is detected (e.g., the triggering of the comparator 22 is detected, or, stated differently, the point at which VDS becomes at least equal to the reference voltage VREF1) at Block 41, the time shift between the falling edge of PWM_LS and the edge of VDS is measured at Block 42, and the time shift error between the reference time shift (time between falling edge of PWM_LS and rising edge of PWM_HS) and sensed time shift (sensed at Block 42) is calculated at Block 43.

An adjustment to be applied to the frequency of the PWM signals is then determined based upon the duty cycle and the calculated time shift error at Block 51. In greater detail, if the phase shift error is zero (Block 51b), operation continues without adjustment (Block 52) and the on and off periods Ton, Toff are not altered (Block 53). If the phase shift error is indicative of the sensed phase shift being greater than the reference phase shift (Block 51a), the frequency of the PWM signals is decreased by a step (Block 51b), and the policy circuit maintains operation in CRM or switches operation from CCM to CRM (Block 52), and the on and off periods Ton, Toff are altered accordingly (Block 53). If the phase shift error is indicative of the sensed phase shift being less than the reference phase shift (Block 51c), the frequency of the PWM signals is increased by a step (Block 51d), and the policy circuit maintains operation in CRM (Block 52), and the on and off periods Ton, Toff are altered accordingly (Block 53).

Advantages of the control circuitry 12 include the fact that no zero-cross sensing is needed and no valley detection (the point at which the inductor current changes from becoming more negative to becoming less negative, or, stated differently, the point at which the slope of the inductor current changes from negative to positive) is needed. Detection of the VDS edge, described above, is simple as it is a large signal and not sensitive to noise or parasitic inductance of the sensing loop. Still further, given that maintenance in CRM mode is made easy through the control circuitry 12, dynamic switching between CCM, CRM, and DCM is made possible.

By maintaining operation in CRM mode, a smaller inductor may be utilized, making the power supply 10 suitable for use in smaller applications, such as wireless power transfer to devices such as wireless cleaning robots.

It is evident that modifications and variations can be made to what has been described and illustrated herein without departing from the scope of this disclosure. For example, although the DC-DC converter 11 is shown above as being a synchronous Buck converter, the same control technique may be applied to any suitable DC-DC converter, and therefore the control of all such DC-DC converters according to the techniques described hereinabove are within the scope of this disclosure.

As a final note, it should be appreciated that the PID controller 16, time-shift control circuit 24, frequency adjustment circuit 25, and policy circuit 26 may be implemented in firmware executed by a microprocessor or other suitable programmable processing circuit.

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A method of operating a DC-DC converter, comprising:
   generating a high-side control signal for a high-side transistor of the DC-DC converter and generating a low-side control signal for a low-side transistor of the DC-DC converter to thereby cause conversion of an input voltage to an output voltage;
   measuring a time shift between a falling edge of the low-side control signal and a time at which a drain-tosource voltage of the low-side transistor becomes higher than a set threshold voltage;

determining a time shift error as a difference between a dead time and the measured time shift, with the dead time being a time between the falling edge of the low-side control signal and a rising edge of the high-side control signal; and adjusting a frequency of the high-side control signal and the low-side control signal, based upon the time shift error, to maintain the DC-DC converter as operating in critical conduction mode.

2. The method of claim 1, wherein adjusting the frequency of the high-side control signal and the low-side control signal, based upon the time shift error, is performed by:

decreasing the frequency of the high-side control signal and the low-side control signal when the measured time shift is greater than the dead time.

3. The method of claim 2, further comprising maintaining the DC-DC converter as operating in the critical conduction mode, or switching operation of the DC-DC converter to the critical conduction mode, based upon the measured time shift being greater than the dead time.

4. The method of claim 2, wherein adjusting the frequency of the high-side control signal and the low-side control signal, based upon the time shift error, is performed by:

increasing the frequency of the high-side control signal and the low-side control signal when the measured time shift is less than the dead time.

5. The method of claim 4, further comprising maintaining the DC-DC converter as operating in the critical conduction mode based upon the measured time shift being less than the dead time.

6. The method of claim 1, further comprising changing the set threshold voltage to thereby change a level of negativity of the inductor current occurring during the dead time.

7. The method of claim 1, further comprising increasing the set threshold voltage to increase a level of negativity of the inductor current occurring during the dead time.

8. The method of claim 1, further comprising decreasing the set threshold voltage to decrease a level of negativity of the inductor current occurring during the dead time.

9. A power converter, comprising:

a DC-DC converter including a high-side transistor and a low-side transistor, the DC-DC converter being operable to convert an input voltage to an output voltage;

pulse width modulation (PWM) circuitry configured to generate a high-side control signal for the high-side transistor and generate a low-side control signal for the low-side transistor to thereby cause conversion of the input voltage to the output voltage;

a comparator configured to assert its output in response to a drain-to-source voltage of the low-side transistor being greater than a set threshold voltage;

time-shift capture circuitry configured to measure a time shift between a falling edge of the low-side control signal and a time at which the comparator is asserted;

time-shift control circuitry configured to determine a time shift error as a difference between a dead time and the measured time shift, with the dead time being a time between the falling edge of the low-side control signal and a rising edge of the high-side control signal;

frequency adjustment circuitry configured to generate an output signal indicative of a frequency of the high-side control signal and the low-side control signal, based upon the time shift error, that would maintain the DC-DC converter as operating in critical conduction mode; and a policy circuit configured to generate a PWM control signal for the PWM circuitry, based upon the output signal from the frequency adjustment circuitry;

wherein the PWM circuitry operates based upon the PWM control signal.

10. The power converter of claim 9, further comprising a coupling clamp configured to clamp the drain-to-source voltage of the low-side transistor and provide that clamped drain-to-source voltage to the comparator.

11. The power converter of claim 10, further comprising a digital-to-analog converter configured to generate the set threshold voltage.

12. The power converter of claim 9, wherein the frequency adjustment circuitry adjusts the frequency of the high-side control signal and the low-side control signal, based upon the time shift error, by decreasing the frequency of the high-side control signal and the low-side control signal when the measured time shift is greater than the dead time.

13. The power converter of claim 12, wherein the policy circuitry is further configured to maintain the DC-DC converter as operating in the critical conduction mode, or switch operation of the DC-DC converter to the critical conduction mode, based upon the measured time shift being greater than the dead time.

14. The power converter of claim 12, wherein the frequency adjustment circuitry adjusts the frequency of the high-side control signal and the low-side control signal, based upon the time shift error, by increasing the frequency of the high-side control signal and the low-side control signal when the measured time shift is less than the dead time.

15. The power converter of claim 14, wherein the policy circuitry is further configured to maintain the DC-DC converter as operating in the critical conduction mode based upon the measured time shift being less than the dead time.

* * * * *